(12) United States Patent
Ockenfuss et al.

(10) Patent No.: US 12,122,060 B2
(45) Date of Patent: Oct. 22, 2024

(54) METHOD AND MACHINING TOOL FOR CUTTING WORKPIECES AND ASSOCIATED COMPUTER PROGRAM PRODUCT

(71) Applicant: TRUMPF Werkzeugmaschinen SE + Co. KG, Ditzingen (DE)

(72) Inventors: Simon Ockenfuss, Renningen (DE); Karl Lukas Knierim, Biberach an der Riss (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 729 days.

(21) Appl. No.: 17/284,077

(22) PCT Filed: Aug. 14, 2019

(86) PCT No.: PCT/EP2019/071849
§ 371 (c)(1),
(2) Date: Apr. 9, 2021

(87) PCT Pub. No.: WO2020/074156
PCT Pub. Date: Apr. 16, 2020

(65) Prior Publication Data
US 2021/0347081 A1    Nov. 11, 2021

(30) Foreign Application Priority Data

Oct. 9, 2018    (DE) .................... 10 2018 217 200.5

(51) Int. Cl.
*B26D 5/00*    (2006.01)
*B23K 26/38*    (2014.01)
(Continued)

(52) U.S. Cl.
CPC ............. *B26D 5/005* (2013.01); *B23K 26/38* (2013.01); *B24C 1/045* (2013.01); *B26F 3/004* (2013.01)

(58) Field of Classification Search
CPC ......... B26F 3/004; B24C 1/045; B23K 26/38; B26D 5/005
See application file for complete search history.

(56) References Cited

U.S. PATENT DOCUMENTS 4,205,828 A * 6/1980 Hooper ................. B23K 7/001
266/77
5,806,390 A * 9/1998 Pomerleau ............ B26D 5/005
700/130
(Continued)

FOREIGN PATENT DOCUMENTS

CN     104625435 A    5/2015
CN     105899322 A    8/2016
(Continued)

*Primary Examiner* — Evan H MacFarlane
*Assistant Examiner* — Liang Dong
(74) *Attorney, Agent, or Firm* — Laurence A. Greenberg; Werner H. Stemer; Ralph E. Locher

(57) ABSTRACT

A method cuts a, in particular flat, workpiece by a cutting beam and a cutting fluid. A workpiece part to be cut away is consecutively cut into at least two smaller portions which fall or are lowered downwards from a surrounding remaining workpiece after they have each been cut away. The division into smaller portions and the execution of the cut for separating the first smaller portion occur such that the point at which the first-cut, first smaller portion is cut away lies within the outer contour of the workpiece part to be cut away.

14 Claims, 3 Drawing Sheets

(51) Int. Cl.
 *B24C 1/04* (2006.01)
 *B26F 3/00* (2006.01)

(56) References Cited

U.S. PATENT DOCUMENTS

| | | | |
|---|---|---|---|
| 6,365,872 B1* | 4/2002 | Arduino | B23K 26/361 |
| | | | 219/121.72 |
| 10,737,967 B2 | 8/2020 | Spier et al. | |
| 2013/0200051 A1 | 8/2013 | Hert | |
| 2016/0271718 A1* | 9/2016 | Fagan | B23K 10/006 |
| 2016/0288257 A1 | 10/2016 | Deiss et al. | |
| 2016/0297033 A1 | 10/2016 | Imaya et al. | |
| 2019/0091799 A1* | 3/2019 | Deiss | B23Q 7/006 |
| 2019/0247961 A1 | 8/2019 | Ottnad et al. | |

FOREIGN PATENT DOCUMENTS

| | | |
|---|---|---|
| DE | 102014200208 B3 | 6/2015 |
| DE | 102015120950 A1 | 6/2017 |
| DE | 102016220844 A1 | 4/2018 |
| JP | H10244394 A | 9/1998 |
| JP | 2004122217 A | 4/2004 |
| JP | 2015100840 A | 6/2015 |
| WO | 9847656 A1 | 10/1998 |
| WO | 2015080179 A1 | 6/2015 |
| WO | 2015104071 A1 | 7/2015 |

* cited by examiner

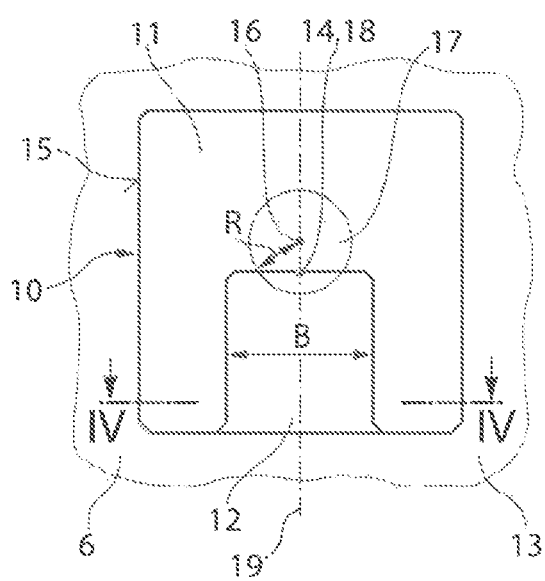
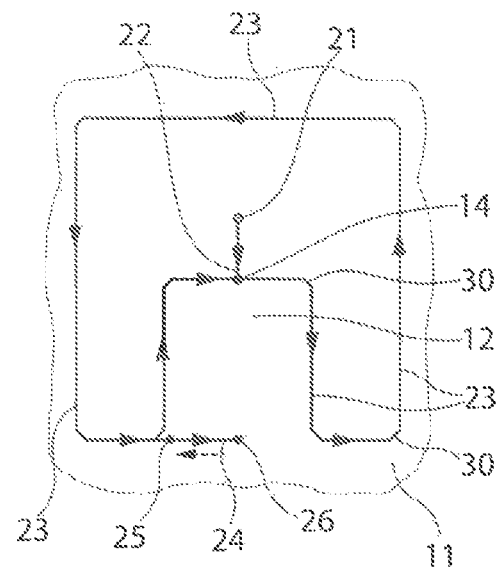
Fig. 2  Fig. 3
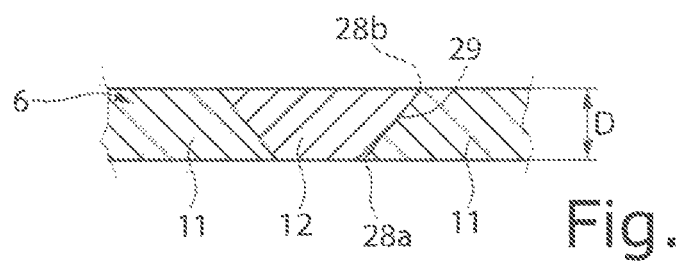
Fig. 4
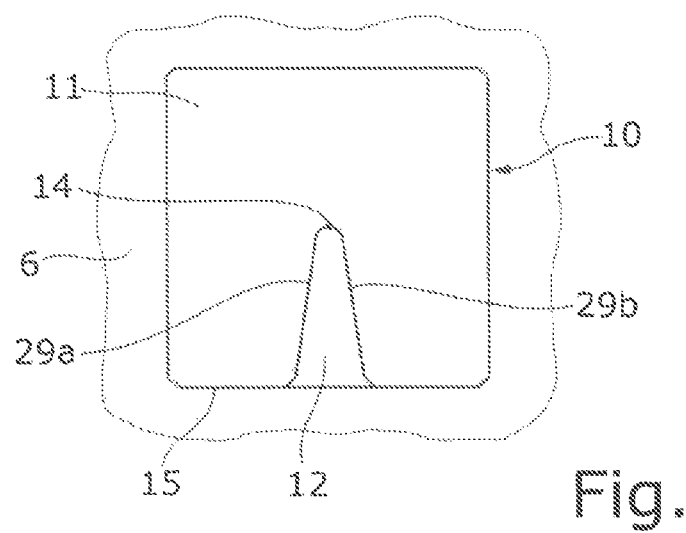
Fig. 5

METHOD AND MACHINING TOOL FOR CUTTING WORKPIECES AND ASSOCIATED COMPUTER PROGRAM PRODUCT

BACKGROUND OF THE INVENTION

Field of the Invention

The invention relates to a method and a machining tool for cutting an in particular plate-like workpiece by means of a cutting beam and a cutting fluid, wherein a workpiece part to be cut away is successively cut into at least two smaller part portions which fall or are lowered downwards from a surrounding remaining workpiece after they have each been cut away, and also to an associated computer program product. The part portions are cut away at a cutaway point at which the respective separating cut of the part portion is completed into a closed contour. The cutting beam and the cutting fluid, for example in water jet cutting, may be identical i.e. formed by the same medium.

When cutting in particular plate-like and metallic workpieces by means of a cutting beam, e.g. by means of a plasma jet, laser beam and/or water jet, small waste parts (offcuts) occur which are usually discharged from the machining region of the cutting tool by free fall. Depending on the thickness of the workpiece and the geometry of the waste part, such a part may however tilt or seize or catch in the remaining workpiece while it is being cut away. These parts can cause collisions with the cutting head and hinder later automated removal of the remaining workpiece from the machine.

It is known from the prior art, for example JPH 10244394 A or WO 2015/080179 A1, in order to improve the process reliability in cutting and discharging workpiece parts, to divide the workpiece part into smaller part portions which can drop safely down after being cut away. JPH 10244394 A discloses, in a U-shaped workpiece part, firstly cutting away the two side legs and then the connecting piece. US 2013/0200051 A discloses chopping up offcuts into a spiral form.

SUMMARY OF THE INVENTION

In comparison, the object of the present invention is to further improve the process reliability when cutting, by means of a cutting beam, workpiece parts which are discharged from the cutting region by free fall after being cut away.

This object is achieved according to the invention in that the division into the part portions and the execution of the cut for separating the first part portion take place such that the cutaway point of the first-cut, first part portion lies inside the outer contour of the workpiece part to be cut away.

According to the invention therefore, the cutaway point of the first part portion does not lie on the outer contour of the workpiece part to be cut away, and is therefore closer to the center of gravity of the first workpiece part. At the moment of cutting away, the tilt moment acting on the first part portion because of the pressure of the cutting fluid (gas pressure, water pressure) is reduced in comparison with a cutaway point on the outer contour of the workpiece part. This leads to a reduced, or in the best case no tilt movement of the first part portion which can thus fall out of the remaining workpiece significantly more reliably. In a second step then, the second part portion is cut away from the remaining workpiece and, since it is largely no longer surrounded by material but lies freely inside the opening in the remaining workpiece which was formed in the first step, falls safely down out of the remaining workpiece. The division of the part portions and the execution of the cut allow the first part portion to be cut away at an optimal cutaway point and thus drop from the remaining workpiece without tilting.

Preferably, the workpiece part to be cut away is divided by area into a larger first part portion and a smaller second part portion. The larger the first part portion, the closer the center of gravity of the first part portion lies to the overall center of gravity of the workpiece part, which increases the process reliability. For example, the workpiece part to be cut away can be divided into a first part portion and a second part portion which is surrounded on three sides by the first part portion. In this case, the second part portion extends as a web into the first part portion.

The second part portion must be selected sufficiently large that the heat introduced into the second part portion during cutting the first part portion can be dissipated to the remaining workpiece. If the width of the second part portion transversely to the heat flow direction is selected too small, the heat cannot be dissipated sufficiently quickly, and a thermal distortion of the second part portion and a seizing of the first to the second part portion may occur. Advantageously therefore, the division into part portions and the execution of the cut for separating the first part portion take place such that the width of the second part portion is at least as large as the thickness of the workpiece.

In order to ensure that only a minimal tilt moment acts on the first part portion because of the cutting fluid pressure at the time of cutting away, the division into the part portions and the execution of the cut for separating the first part portion take place particularly preferably such that the cutaway point of the first part portion lies in a radius about the center of gravity of the first part portion, wherein the circle area delimited by the radius takes up less than ⅓ of the area of the first part portion. Preferably, the cutaway point of the first part portion lies in the center of gravity of the workpiece part to be cut away, in the center of gravity of the first part portion or in the region between these two centers of gravity.

The geometry of the second part portion is established such that it constitutes as small as possible a risk of tilting of the first part portion after it has been cut away. For this, the geometry of the second part portion may be selected such that its cross-section or the distance of the mutually opposing side edges from the cutaway point of the first part portion to the cutaway point of the second part portion is increased. Thus the second part portion has side edges running inward towards one another from the outer contour of the workpiece part, giving a conical shape of the second part portion. Further preferably, the shape of the second part region is symmetrical, and in particular the outer contour of the second part region does not have any right angles at the corners but is chamfered or rounded at the corners.

In order to effectively prevent a tilting of the first part portion on the second, preferably the separating cut between the first and second part portions is made without angular corners, but with chamfered or rounded corners.

In a refinement of the invention, the separating cut between the first and second part portions is made obliquely such that the lower edge of the first part portion protrudes further outward than the upper edge, i.e. for example mutually facing side edges of the second part portion have a downwardly tapering conical form. This facilitates the downward fall of the first part portion and is possible if the machining tool allows an oblique setting of the machining head so that cut edges can be produced which slope relative to the workpiece surface.

To improve the edge quality on cutting the second part portion, when the first part portion is cut away, a partial separating can already be made between the second part portion and the remaining workpiece, so the connecting contour between the second part portion and the remaining workpiece is already started.

In particular if the center of gravity of the workpiece part to be cut away lies outside the workpiece part, the workpiece part may be subdivided into several segments to be cut successively, wherein at least one segment is divided into at least two part portions as described above, which are cut successively. The segments here are selected such that their center of gravity lies inside the contour of the respective segment. It is also possible to divide all segments into at least two part portions.

The invention also relates to a machining tool suitable for performing the method according to the invention, with a cutting beam (jet-like tool) and a cutting fluid, with a machining head which can be moved relative to the workpiece and from which the cutting beam and cutting fluid emerge, and with a machine controller which is programmed to control the relative movement between the machining head and the workpiece according to the method described above. In a water jet cutting machine, the cutting fluid simultaneously forms the cutting jet, i.e. the cutting jet and cutting fluid are identical.

The invention finally relates to a computer program product having coding means which are adapted for performing all steps of the method described above when the program runs on a machine controller of a machining tool.

Further advantages and advantageous embodiments of the subject of the invention arise from the description, the claims and the drawing. Also, the features mentioned above and those presented below may be used alone or grouped in arbitrary combinations. The embodiments shown and described should not be regarded as a comprehensive list, but rather have an exemplary character for the illustration of the invention.

BRIEF DESCRIPTION OF THE SEVERAL VIEWS OF THE DRAWING

FIG. 2 a division made with the laser cutting method according to the invention, for dividing a workpiece part to be cut away into two smaller part portions;

FIG. 3 an advantageous execution of a cut for cutting the first part portion away from the second part portion and from the remaining workpiece;

FIG. 4 a sectional view of a workpiece part along line IV-IV in FIG. 2 at the moment of cutting away;

FIG. 5 a division, modified with respect to FIG. 2, of the workpiece part to be cut away into two smaller part portions;

DETAILED DESCRIPTION OF THE INVENTION

Figure 1:
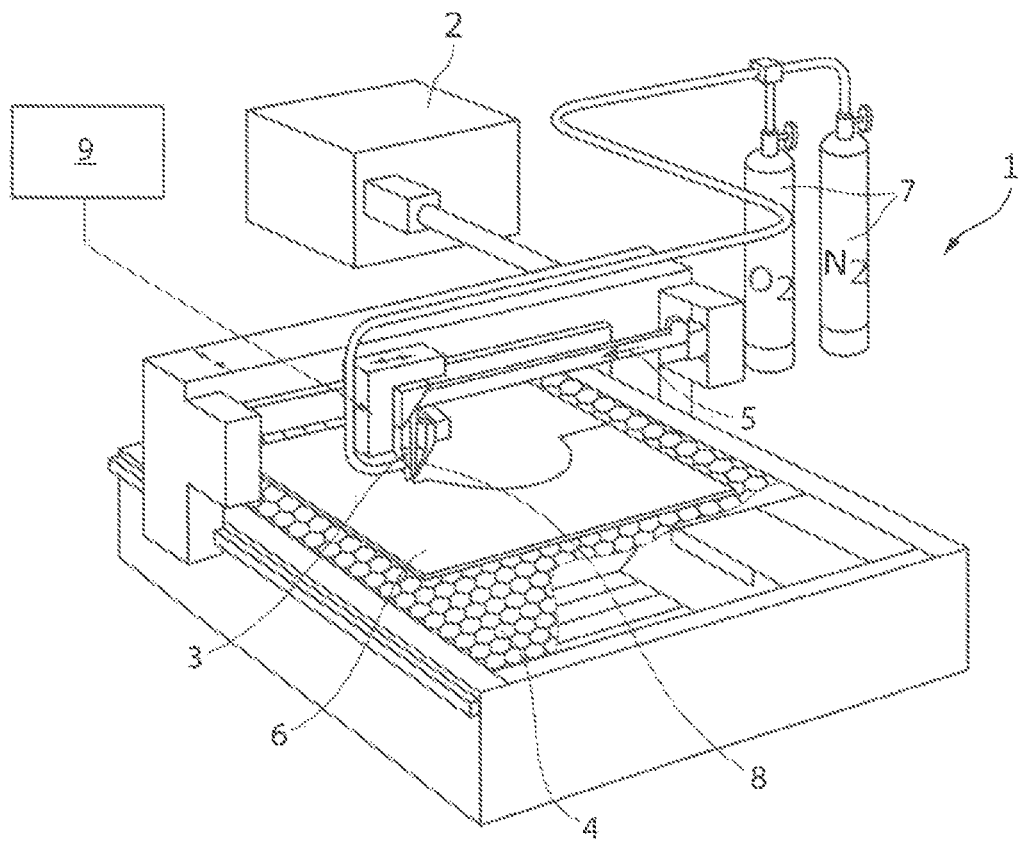
FIG. 1 a laser machining tool suitable for performing the laser cutting method according to the invention for cutting away workpiece parts.

FIG. 1 shows in perspective a machining tool with a beam-shaped tool, using the example of a laser machining tool 1. Further exemplary embodiments of such machining tools are a combined punching/laser cutting machine, a plasma cutting machine or a water jet cutting machine. The laser machining tool 1 for example comprises a $CO_2$ laser, a diode laser or a solid state laser as a laser beam generator 2, a movable machining head 3 and a workpiece support 4. The laser beam generator 2 generates a laser beam 5 which is guided from the laser beam generator 2 to the machining head 3 by means of an optical fiber cable (not shown) or deflecting mirrors (not shown). A workpiece 6 in the form of a plate is arranged on the workpiece support 4. The laser beam 5 is directed onto the workpiece 6 by means of a focusing optic arranged in the machining head 3.

The laser machining tool 1 is furthermore supplied with cutting gases 7, for example oxygen and nitrogen. Alternatively or additionally, compressed air or application-specific gases, such as e.g. inert gases, may be provided. The cutting gas 7 is conducted to a cutting gas nozzle 8 of the machining head 3, from which it emerges together with the laser beam 5 in the direction of the workpiece 6. The laser machining tool 1 furthermore comprises a machine controller 9 which is programmed to move the machining head 3 and its cutting gas nozzle 8 relative to the workpiece 6 following a cutting contour.

Instead of moving the machining head 3 relative to the stationary workpiece 6, the workpiece 6 may also be moved relative to a stationary machining head 3. It is also possible to superpose a movement of the machining head 3 and a movement of the workpiece 6.

A laser cutting process for cutting a workpiece part 10 away from the workpiece 6 is described below with reference to FIG. 2, wherein the workpiece part 10 to be cut away constitutes a waste part (an offcut) and is cut successively along a separating cut 23 (FIG. 3) into two smaller part portions 11, 12 which, after being cut away, drop downward from the surrounding remaining workpiece 13. The part portions 11, 12 are each cut away at a cutaway point at which the cutting contour of the part portion, i.e. the respective separating cut 23, is completed into a closed contour. The cutaway point of the first part portion 11 is marked 14 in FIG. 2.

The division into the part portions 11, 12 and the execution of the cut for separating the first part portion 11 are selected such that the cutaway point 14 of the first-cut, first part portion 11 lies inside the outer contour 15 of the workpiece part 10 to be cut away, i.e. not on the outer contour 15. Preferably, the first part portion 11 is larger in area than the second part portion 12 and surrounds the second part portion 12 on three sides. As shown as an example in FIG. 2, the first part portion 11 may be approximately U-shaped, and the second part portion 12 approximately rectangular.

In the first method step, the first part portion 11 is cut away and drops out of the surrounding remaining workpiece 12, 13. At the moment of cutting away, i.e. at the cutaway point 14, the tilt moment acting on the first part portion 11 because of the pressure of the cutting gas 7 is reduced in comparison with a cutaway point which lies on the outer contour 15. This leads to a reduced, or in the best case no tilt movement of the first part portion 11, which can therefore fall away from the surrounding remaining part portion 12, 13 more reliably or without tilting. The second part portion ("macro joint") 12 initially remains connected to the surrounding remaining workpiece 13. In a second method step, the second part portion 12 is then cut away from the remaining workpiece 13 and, since it is largely no longer surrounded by material but lies freely inside the opening formed in the remaining workpiece 13 in the first method step, falls down from the remaining workpiece 13 reliably and without tilting.

To ensure that at the time of cutting away, as far as possible no tilt moment or only a negligible tilt moment acts on the first part portion 11 because of the effect of the cutting gas pressure, the cutaway point 14 of the first part portion 11 lies as far as possible in a radius R around the center of gravity 16 of the first part portion 11, wherein the circle area 17 delimited by the radius R amounts to less than 1/3, preferably less than 1/5 of the total area of the first part portion 11. Preferably, the cutaway point 14 of the first part portion 11 lies in the center of gravity 18 of the workpiece part 10 to be cut away, in the center of gravity 16 of the first part portion 11, or in the region between these two centers of gravity 16, 18.

As shown further in FIG. 2, the second part portion 11 is preferably symmetrical to a line 19 running through the centers of gravity 16, 18 of the workpiece part 10 to be cut away and the first part portion 11.

The second part portion 12 must be selected sufficiently large that the heat introduced into the second part portion 12 on cutting of the first part portion 11 can be dissipated to the remaining workpiece 13. Also, the second part portion 12 must be selected so wide that, until the first part portion 11 is completely cut away, it can absorb the weight of the workpiece part 10 and the cutting gas pressure without any significant bending of the second part portion 12. Therefore the width B of the second part portion 12 should be at least as large as the thickness D (FIG. 4) of the workpiece 6.

In FIG. 2, a cutting gas nozzle 8 is used from which the cutting gas 7 emerges coaxially to the laser beam 5 in the direction of the workpiece 6, i.e. at the time of cutting away the first part portion 4, the contact point 20 at which the cutting gas 7 meets the first part portion 11 lies in the cutaway point 14.

If however the cutting gas 7 meets the workpiece 6 eccentrically to the laser beam 5, at the time of cutting away the first part portion 11, either the cutting gas 7 meets the workpiece 6 outside the first part portion 11 or, if this is not possible, the cutaway point 14 of the first part portion 11 lies if possible in the region between the center of gravity 16 of the first part portion 11 and the contact point 20.

FIG. 3 shows an advantageous execution of the cut for cutting away the first part portion 11 from the second part portion 12 and from the remaining workpiece 13. The piercing point occurs at 21, close to the cutaway point 14 for the first part portion 11, and the cutting line (starting cut) 22 then runs to the cutaway point 14 at the tip of the second part portion 12 before then the closed separating cut 23 of the first part portion 11 is executed and again ends at the cutaway point 14. If a part is produced without starting cut, the piercing point lies on the closed separating cut 23 of the first part portion 11. To improve the edge quality when cutting away the second part portion 12, during cutting of the first part portion 11, a partial separating cut 24 may be made between the second part portion 12 and the remaining workpiece 13. The laser beam 5, starting at 25, moves slightly along the connecting contour between the second part portion 12 and the remaining workpiece 13, is switched off at the turning point 26 and switched on again at the point 25 in order to cut the contour of the first part portion 11 to the end. The later separation of the second part portion 12 can take place with improved quality at the cut edge.

The geometry of the second part portion 12 is established such that this constitutes a small as possible a risk of tilting of the cutaway first part portion 11. As shown in FIG. 4, the separating cut 27 between the first and the second part portions 11, 12 is ideally executed obliquely such that the lower edge 28a of the first part portion 11 protrudes further into the second part portion 12 than the upper edge 28b. In this way, the first part portion 11 has edges 29 which slope with respect to the second part portion 12 and do not hinder the dropping of the first part portion 11.

As also shown in FIGS. 2 and 3, the separating cut 23 between the first and the second part portions 11, 12 may be executed not with angular corners but with chamfered or rounded corners 30, in order thus to effectively prevent tilting of the first part portion on the second.

As shown in FIG. 5, alternatively or additionally to the oblique edges 29, the division into the part portions 11, 12 may take place such that the second part portion 12 has two side edges 29a, 29b running towards one another from the outer contour 15 of the workpiece part 10 to the cutaway point 14 of the first part portion 11. The side edges 29a, 29b, which do not run parallel to one another, also counter any tilting of the first part portion on the second.

Figure 6:
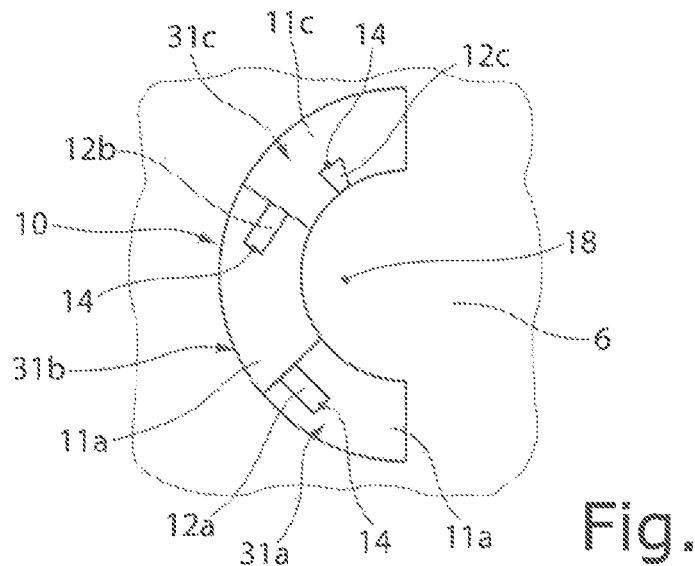
FIG. 6 a subdivision of the workpiece part to be cut away into several segments which in turn are each divided into two part portions to be cut separately.

In particular for the case in which, as in FIG. 6, the center of gravity 18 of the workpiece part 10 to be cut away lies outside the workpiece part 10, the workpiece part 10 is subdivided into several segments 31a-31c to be cut successively, which in turn—as described above—may each be divided into two part portions 11a, 12b, 11b, 12b and 11c, 12c, which—as described above—are then cut successively. The workpiece part 10 must be subdivided into smaller segments until the cutaway point 14 of the first part portion 11a, 11b, 11c in each segment lies inside the outer contour of the respective segment. In FIG. 5, firstly segment 31a and then segment 31b and finally segment 31c are cut.

Figure 7:
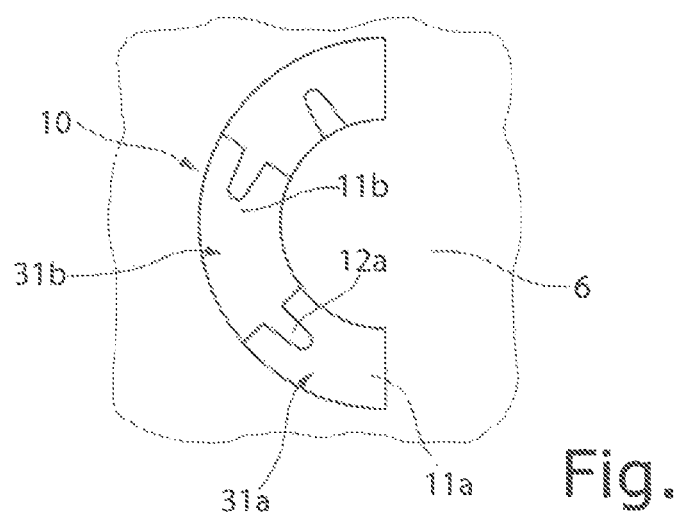
FIG. 7 a segment subdivision, modified with respect to FIG. 6, of the workpiece part to be cut away.

If the second part portion 12a of a first segment 31a (as shown in FIG. 7) is attached to an adjacent second segment 31b which should also drop down, there is no need for distinct separation of the second part portion 12a. The second part portion 12a of the first segment 31a thus becomes part of the first part portion 11b of the second segment 31b. Thus the productivity of the cutting process may be increased.

The invention claimed is:

1. A method for cutting a workpiece with a cutting beam and a cutting fluid, which comprises the steps of:
   successively cutting a waste workpiece part into at least two smaller waste part portions which directly border each other, the at least two smaller waste part portions separate from a surrounding remaining workpiece after the at least two smaller waste part portions have each been cut away, wherein a division into the at least two smaller waste part portions and an execution of a cut for separating a first part portion of the at least two smaller waste part portions takes place such that a cutaway point of the first part portion, the cutaway point which is cut first, lies inside an outer contour of the waste workpiece part to be cut away, wherein the division into the at least two smaller waste part portions and the execution of the cut for separating the first part portion take place such that the cutaway point of the first part portion lies in a radius about a center of gravity of the first part portion, wherein a circle area delimited by the radius takes up less than 1/3 of a total area of the first part portion.

2. The method according to claim 1, which further comprises dividing the at least two smaller waste part portions to be cut away by area into the first part portion and a second part portion.

3. The method according to claim 2, wherein the division into the at least two smaller waste part portions and the execution of the cut for separating the first part portion take place such that a width of the second part portion is at least as large as a thickness of the workpiece.

4. The method according to claim 2, wherein the division into the at least two smaller waste part portions takes place such that the second part portion has two side edges running towards one another from the outer contour of the waste workpiece part to the cutaway point of the first part portion.

5. The method according to claim 2, which further comprises making a separating cut between the first and second part portions without angular corners.

6. The method according to claim 2, which further comprises making a separating cut between the first and second part portions obliquely such that a lower edge of the first part portion protrudes further into the second part portion than an upper edge.

7. The method according to claim 2, wherein when the first part portion is cut away, a partial separating cut is already made between the second part portion and the surrounding remaining workpiece.

8. The method according to claim 2, which further comprises subdividing the waste workpiece part into several segments to be cut successively from the surrounding remaining workpiece, wherein at least one of the several segments is divided into the at least two smaller waste part portions to be cut successively.

9. The method according to claim 1, which further comprises dividing the at least two smaller waste part portions to be cut away into the first part portion and a second part portion which is surrounded on three sides by the first part portion.

10. The method according to claim 1, wherein the division into the at least two smaller waste part portions and the execution of the cut for separating the first part portion take place such that the cutaway point of the first part portion lies in a center of gravity of the waste workpiece part to be cut away, in the center of gravity of the first part portion or in a region between the center of gravity of the workpiece part to be cut away and the center of gravity of the first part portion.

11. The method according to claim 1, which further comprises dividing the at least two smaller waste part portions to be cut away by area into the first part portion and a smaller second part portion.

12. A machining tool, comprising:
a cutting beam;
a cutting fluid for separating a workpiece into at least one waste workpiece part and a remaining workpiece;
a machining head which can be moved relative to the workpiece and from which said cutting beam and said cutting fluid emerge; and
a machine controller being programmed to control a relative movement between said machining head and the workpiece, said machine controller programmed to:
successively cut the waste workpiece part to be cut away into at least two smaller waste part portions which directly border each other and which fall or are lowered downwards from a surrounding said remaining workpiece after the at least two smaller waste part portions have each been cut away, wherein a division into the at least two at least two smaller waste part portions and an execution of a cut for separating a first part portion of the at least two smaller waste part portions takes place such that a cutaway point of the first part portion which is cut first, lies inside an outer contour of the waste workpiece part to be cut away, wherein the division into the at least two smaller waste part portions and the execution of the cut for separating the first part portion take place such that the cutaway point of the first part portion lies in a radius about a center of gravity of the first part portion, wherein a circle area delimited by the radius takes up less than ⅓ of a total area of the first part portion.

13. The machining tool according to claim 12, wherein the workpiece is a plate-shaped workpiece.

14. A non-transitory computer readable medium having computer executable instruction for performing a method for cutting a workpiece with a cutting beam and a cutting fluid when the computer executable instructions run on a machine controller of a machining tool, the method comprises the steps of:
successively cutting a waste workpiece part to be cut away into at least two smaller waste part portions which directly border each other and which separate from a surrounding remaining workpiece after the at least two smaller waste part portions have each been cut away, wherein a division into the at least two smaller waste part portions and an execution of the cut for separating a first part portion of the at least two smaller waste part portions takes place such that at a cutaway point of the first part portion which is cut first, lies inside an outer contour of the workpiece part to be cut away, wherein the division into the at least two smaller waste part portions and the execution of the cut for separating the first part portion take place such that the cutaway point of the first part portion lies in a radius about a center of gravity of the first part portion, wherein a circle area delimited by the radius takes up less than ⅓ of a total area of the first part portion.

* * * * *